United States Patent

[11] 3,633,998

| [72] | Inventor | Bernard Bourrouilh<br>Maule, France |
|---|---|---|
| [21] | Appl. No. | 42,262 |
| [22] | Filed | June 1, 1970 |
| [45] | Patented | Jan. 11, 1972 |
| [73] | Assignee | Enterprise de Recherches et d'Activities<br>Petrolieres<br>Paris, France |
| [32] | Priority | June 10, 1969 |
| [33] | | France |
| [31] | | 6919089 |

[54] OPTICAL FILTERING METHOD AND DEVICE FOR DATA PROCESSING
10 Claims, 10 Drawing Figs.

[52] U.S. Cl..................................................350/162 SF, 340/15.5 VD
[51] Int. Cl......................................................G02b 27/38
[50] Field of Search............................................350/162 SF, 162 R

[56] References Cited
UNITED STATES PATENTS

| 3,240,108 | 3/1966 | Lehan et al.................. | 350/162 SF UX |
| 3,370,268 | 2/1968 | Dobrin et al.................. | 350/162 SF UX |
| 3,418,626 | 12/1968 | Farr et al...................... | 350/162 X |
| 3,519,331 | 7/1970 | Cutrona et al................ | 350/162 |

OTHER REFERENCES

Cutrona " Optical Computing Techniques" IEEE Spectrum Vol. 1, No. 10, Oct. 1964, pp. 101–108.

*Primary Examiner*—John K. Corbin
*Attorney*—Young & Thompson

ABSTRACT: The invention concerns an optical method for processing information represented by the transparency of a two-dimensional document such as a photographic record. Optical methods are known wherein the document is illuminated with a parallel beam of coherent monochromatic light and placed in the object plane of a convergent optical conversion system to form in a spectral plane the spectrum of the function that represents the transparency of the document. A filter is placed in the spectral plane and an optical reconstitution system forms a filtered image of the document. According to the invention, the filter consists of a screen, the transparency of which varies over its surface as the autocorrelation function of the spectrum of the function that represents the transparency of the document.

PATENTED JAN 11 1972

INVENTOR

BERNARD BOURROUILH

By Young + Thompson
ATTYS.

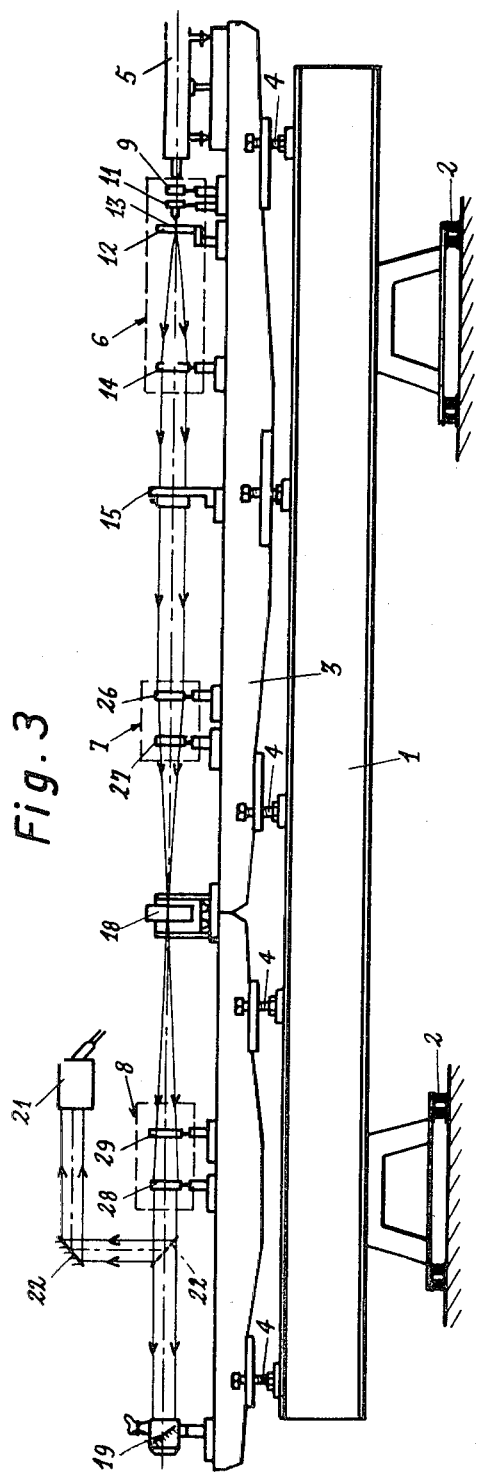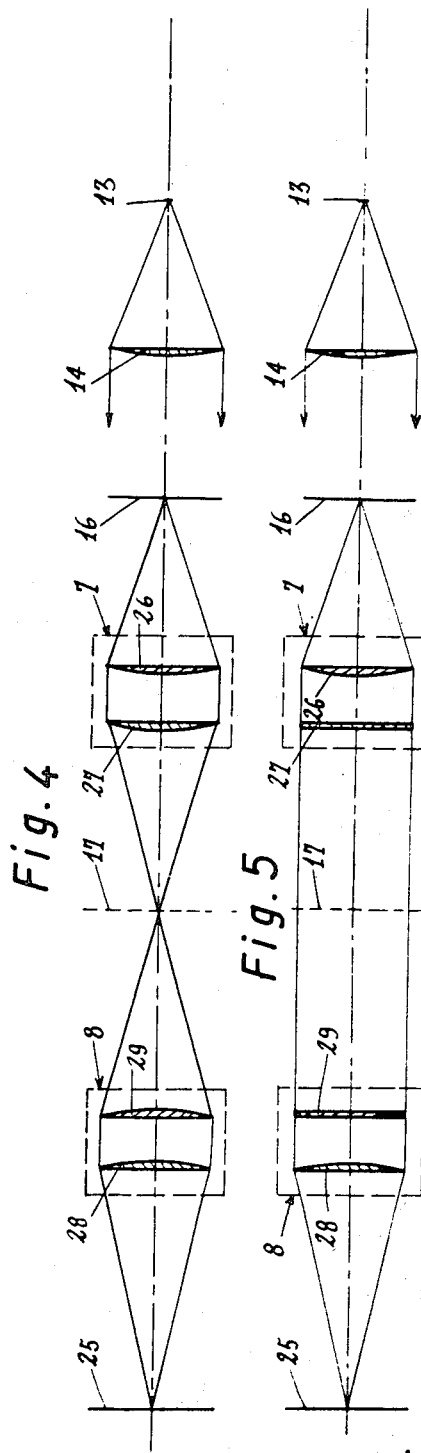

OPTICAL FILTERING METHOD AND DEVICE FOR DATA PROCESSING

This invention relates to an optical method for processing information represented by the transparency of a two-dimensional document. The invention applies especially although not in any limiting sense to the processing of recordings obtained by means of the seismic exploration methods which are employed in petroleum prospecting.

The invention is also concerned with a device for carrying out the method.

As is generally known, the object of the seismic method is to study the propagation within the earth of sound waves which are either reflected or refracted by the successive subsurface beds. Seismographs detect the acoustic energy which reaches the surface and produce signals which are recorded simultaneously on a photographic document after suitable coding. This document is therefor presented in the form of parallel bands and each band contains the trace of a seismograph.

The method is also applicable to other documents such as an aerial photograph or a photograph of the earth's surface taken from a satellite or else a microphotograph of a crystal.

This type of document usually contains random elements and elements which have a periodic character. Thus, in a photograph of the surface of the sea, wave crests in parallel alignment and in uniformly spaced relation are distinguished. These alignments make it possible to deduce the direction of the wind and consequently represent useful information which can be optimized by eliminating or at least attenuating superimposed movements of random character.

In the case of seismic records, it is known that the sound waves which travel through the successive subsurface layers are partially reflected at each interface between two layers which have different acoustic properties. Part of the reflected energy travels to the surface and produces in the seismographs a so-called primary signal which indicates the position of the reflecting interface. But another part of this energy is again reflected from the upper interfaces as well as from the ground surface and constitutes a secondary wave which in turn gives rise to a series of further reflections. There is thus received at the surface a series of signals known as multiple reflection signals or more briefly as "multiples" which are superimposed on the primary signals and make it difficult to read the document without supplying additional information. In this case, it is an advantage to eliminate these periodic distribution multiples in order to enhance the primary signals which have a random distribution.

A known optical method of data processing or so-called double diffraction method makes it possible to filter the information contained in a photographic document. In this method, the document is illuminated with a parallel beam of coherent monochromatic light produced by a laser, for example, and the document is placed in an object plane upstream of a convergent optical system or so-called "conversion system." A diffraction pattern is then formed in the image focal plane of said system which shows a light intensity distribution that represents the two-dimensional spectrum, or two-variables Fourier transform, of the function which expresses the transparency of the document in relation to a system of two coordinates in the plane of said document. If a second convergent optical system or so-called "reconstitution system" is placed downstream of said focal plane (also referred to as the spectral plane), there is obtained in the image focal plane of this second system a second diffraction pattern which corresponds to the inverse Fourier transform, that is to say to a reconstituted real image of the document. If a screen or filter which removes part of the rays emerging from the spectrum is interposed in the spectral plane, there is obtained in the image focal plane of the reconstitution system an image of the document from which a number of elements have been removed.

Filters of a known type consist of screens having the shape of sectors or wedges for the purpose of eliminating from the reconstituted image any information of the document which is aligned in directions comprised within said sectors. It is also possible to make use of screens having transparent sectors which make it possible on the contrary to pass the elements constituting alignments in directions which are limited by said sectors. Filters of this type are known as directional filters.

Another known type of filter which is referred to as a frequency filter makes it possible to remove a band of predetermined frequencies. In a spherical optical system, there filters may consist, for example, of screens having symmetry about the optical axis of the two convergent optical systems such as circular diaphragms or rings.

However, elements of information having a periodic character cannot be separated all at once from elements having a random character by means of the known filters mentioned above. For example, such filters do not permit removal of multiple reflections from seismographic records. This removal is carried out at the present time by making use of digital computers, with the result that processing takes a fairly long time and entails high cost.

The primary object of the present invention is to overcome this limitation.

The optical method according to the invention for processing information represented by the transparency of a two-dimensional document wherein said document is illuminated with a parallel beam of coherent monochromatic light and is placed in an object plane upstream of a convergent optical conversion system in order to obtain in the image focal plane of said system which constitutes the spectral plane a diffraction pattern having a light amplitude distribution corresponding to the spectrum of the function which represents the transparency of the document, a filter is placed in said spectral plane in order to filter said spectrum and a convergent optical reconstitution system is placed downstream of the spectral plane so as to form a filtered image of the document, is characterized in that said filter consists of a screen having a transparency which varies over its surface as the autocorrelation function of the spectrum of the document.

It has in fact been found that a filter of this type makes it possible to separate the periodic elements from the random elements contained in the information recorded on the original document and therefore to remove either of these two classes of elements.

In a preferred form of the invention, the preparation of the filter entails the following steps:

the document is placed in the object plane and the spectrum formed in the spectral plane is photographed so as to obtain a power spectrum of the first order, said power spectrum of the first order is placed in the object plane and the preceding operation is repeated in order to obtain a power spectrum of the second order, said second order spectrum is placed in the object plane and the operation is repeated in order to obtain a positive power spectrum of the third order, the transparency of which varies as the autocorrelation function of the first-order spectrum.

In an advantageous form of the invention, the film which is obtained after each operation is reversed by producing an image on a photographic plate in contact with said film to obtain a power spectrum of reverse polarity which is placed in the object plane for the following operation.

This positive spectrum of the third order can be employed as a filter for the purpose of removing the random elements from the filtered image of the document.

Should it be found desirable on the contrary to remove the periodic elements, said positive spectrum is reversed by printing in contact with this latter a photographic plate on which there appears a negative spectrum of the third order which is employed as a filter.

Further properties of the invention will now become apparent from the following detailed description.

A number of embodiments of a device for carrying out the method according to the invention as well as one example of application of the method are illustrated in the accompanying drawings which are given by way of example but without any limitation, and in which:

FIG. 3 is a view in elevation showing an optical bench for carrying out the method in spherocylindrical optics;

FIG. 4 is the corresponding optical diagram in the horizontal plane;

FIG. 5 is the corresponding optical diagram in the vertical plane;

Figure 1:
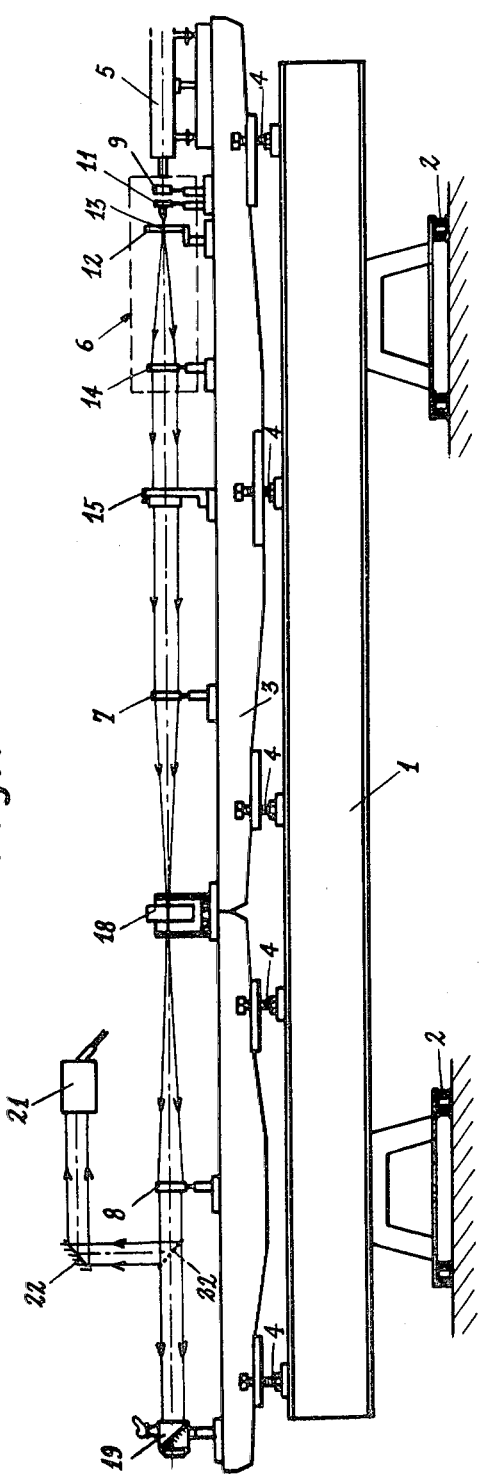
FIG. 1 is a view in elevation showing an optical bench for carrying out the method in spherical optics.

There is shown in FIG. 1 an optical bench for carrying out the method in spherical optics.

Said bench comprises a beam 1 which is mounted on shock absorbers 2. The beam 1 is adapted to support a table 3 by means of jacks 4 which serve to bring the top face of the table 3 in a horizontal plane.

There are mounted on the table 3 a coherent monochromatic light source 5, a collimation unit 6, a convergent optical conversion system 7, and a convergent optical reconstitution system 8.

The coherent light source 5 is constituted, for example, by a neon-helium gas laser which operates at a wavelength of 6,328 angstroms, namely in the red region of the spectrum.

The collimation unit 6 comprises a shutter 9 fitted with a diaphragm for limiting the beam emitted by the laser, a microscope objective 11 and a plate 12. Said plate is pierced by a very small hole 13 on which the light beam is focused by the objective 11 and which performs the function of virtual point source. A collimating lens 14 is mounted downstream of the point source 13.

The optical conversion and reconstitution systems comprise in the embodiment of FIG. 1 a convergent spherical lens as designated respectively by the reference numerals 7 and 8.

There is mounted upstream of the conversion lens 7 an adjustable and orientable object holder 15 on which the object 16 is mounted (shown in FIG. 2) As will become apparent hereinafter, said object is either the original document to be processed or the spectra of successive orders.

Figure 2:
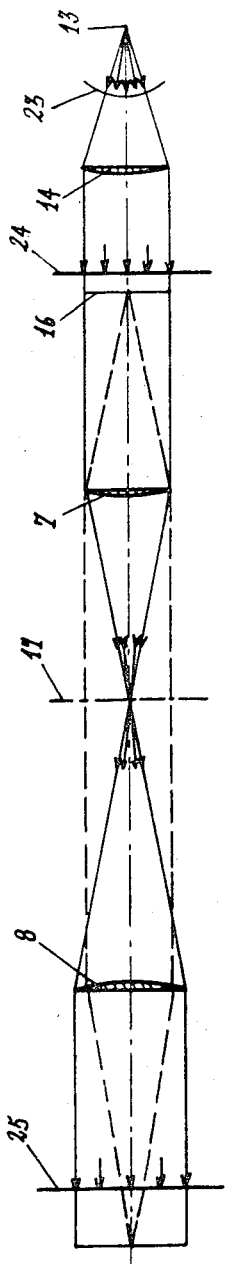
FIG. 2 is the corresponding optical diagram.

There is disposed in the image focal plane 17 (as shown in FIG. 2) a filter holder 18 which is both retractable, orientable and adjustable.

The optical bench further comprises a photographic apparatus 19 and a television camera 21. Retractable mirrors 22 serve to reflect the light beam to the camera 21.

The virtual point source 13 is the center of spherical waves of which a particular wave surface is shown at 23. The collimating lens 14 converts the incident beam to a parallel beam; the wave surfaces such as the surface 24 of said parallel beam are planes which are parallel to the plane of the object and at right angles to the optical axis of the systems 7 and 8. Inasmuch as the light emitted by the laser 5 is spatially coherent, all the incident rays are in phase in the object plane 16.

It is known that, under these conditions, there is formed in the image focal plane 17 of the conversion lens 7 a diffraction pattern in which the light amplitude is proportional to the Fourier transform of the two-variable function which expresses the light distribution emerging from the object plane 16. Inasmuch as the distribution just referred to is proportional to the transparency of the object, there is thus obtained at 17 the two-dimensional spectrum of the transparency of the object 16.

If no filter is interposed in the image focal plane 17 or so-called spectral plane, the inverse Fourier transform or in other words a real image of the object 16 is thus obtained in the image focal plane 25 of the reconstitution system 8.

FIGS. 3 to 5 relate to an optical bench which is similar to the bench hereinabove described but is equipped in spherocylindrical optics instead of spherical optics. In FIGS. 3 to 5, the same elements as in FIGS. 1 and 2 are provided with the same reference numerals.

The light source 5, the collimation system 6 and the recording and control instruments 19 to 22 are the same as those mentioned in the foregoing.

The optical conversion system 7 comprises a spherical lens 26 associated with a cylindrical lens 27. The lens 27 is positioned downstream of the spherical lens 26 and has a shorter focal length than this latter. The two lenses 26 and 27 are so arranged that their image focal planes coincide in order to constitute the spectral plane 17.

The optical reconstitution system also comprises a spherical lens 28 and a cylindrical lens 29 which is mounted upstream of the spherical lens 28, the object focal planes being in coincident relation.

The object holder 15 is so arranged that the object plane 16 (as shown in FIGS. 4 and 5) coincides with the object focal plane of the spherical conversion lens 26.

The cylindrical lenses 27 and 29 are so arranged that their generatrices are vertical.

Under these conditions, if the light beam is intersected by a horizontal plane (as shown in FIG. 4), parallel rays which emerge from the spherical lens 26 are refracted in said plane by the cylindrical lens 27 and converge at a point of the spectral plane 17. On the other hand, in a vertical plane (as shown in FIG. 5), the cylindrical lens 27 behaves as a plate having parallel faces and parallel rays emerging from the spherical lens 26 remain parallel after having passed through the lens 27.

Thus, all the rays emerging from a common vertical straight line of the object plane 16 converge on a common vertical straight line of the spectral plane 17 but there is no point-to-point correspondence between these two straight lines. The light amplitude along the straight line of the spectral plane is proportional to the Fourier transform of the function—with only one variable—which represents the variation in transparency of the object along the corresponding straight line.

It is therefore apparent that, instead of the overall two-dimensional spectrum which is obtained by means of the bench of FIG. 1 in spherical optics, there is obtained an infinite number of one-dimensional spectra each corresponding to a vertical section of the object plane.

In particular, if the object 16 is a seismic document or record if the said record is placed so that the traces of the different seismographs are strictly parallel to the generatrices of the cylindrical lens 27, there are accordingly obtained in the spectral plane 17 the individual juxtaposed spectra of the different traces which are considered as independent functions with respect to each other.

In order to separate the recurrent or periodic elements from the random elements in the information which is represented by the transparency of the object 16, it is intended in accordance with the invention to dispose in the spectral plane 17 a filter consisting of a plane screen, the transparency of which varies on the surface of said screen as the autocorrelation function of the spectrum of the function representing the variations in transparency of the object 16.

Said filter is preferably obtained by means of the optical bench which has just been described in the following series of operations:

a. the original document to be processed is placed in the object plane 16. As has been stated earlier, there is formed in the spectral plane 17 a diffraction pattern having light amplitude which is proportional to the spectrum of the function which expresses the transparency of the object. A photograph of this spectrum is taken by means of the apparatus 19 and the film which is thus obtained is reversed (so that a negative image thus becomes a positive image) by printing a photographic plate in contact with said film.

The transparency of a printed photographic emulsion is inversely proportional to the square of the intensity of radiation received and is not dependent on the relative phase of the incident rays. In consequence, the transparency of the photographic plate is proportional to the power spectrum of the function which expresses the transparency of the original document. In order to simplify the language, the function just mentioned will be described hereinafter as the "primary functon." It is known that the power spectrum of a function is also the Fourier transform of the autocorrelation function of the function considered. This spectrum will be designated as a first-order positive spectrum.

b. This first-order spectrum is placed in the object plane 16 and the two operations (a) are repeated or in other words a photograph is taken of the diffraction pattern in the spectral plane 17 and the film obtained is reversed. There is thus obtained a positive power spectrum of the second order, namely the power spectrum of the second order, namely the power spectrum of the first-order power spectrum. In accordance with the considerations which were recalled earlier, this power spectrum is the autocorrelation function of the "primary function."

c. This second-order spectrum is placed in the object plane 16 and the two operations (a) are repeated. There is then obtained a positive power spectrum of the third order. This spectrum is the spectrum of the autocorrelation function of the "primary function" and also the autocorrelation function of the spectrum of the "primary function."

If this positive spectrum is employed as a filter in the spectral plane 17 and if the document to be processed is placed in the object plane 16, there is obtained in the image focal plane 25 a filtered real image of the document from which the nonperiodic random elements have been removed or at least highly attenuated.

The polarity of said third-order power spectrum can also be reversed in order to obtain a third-order negative spectrum. If this latter is employed as a filter in the spectral plane 17, there is thus obtained a filtered image of the document from which the periodic elements have been removed.

Although this has no direct bearing on the invention and is not intended to imply any limitation of its scope, there can be proposed a possible explanation of the result which has just been mentioned. For the sake of simplicity, the line of reasoning adopted will be limited to the case of only one dimension.

Let $f(t)$ be a function to be processed and representing, for example, the trace of a seismogram. This function can be considered as the product of convolution of a nonperiodic function $I(t)$ and of a periodic function $M(t)$. In the case of a seismogram, $M(t)$ represents the multiplication operator. This product of convolution will be represented by:

$$f(t) = I(t) * M(t)$$

It is known that the Fourier transform of the product of convolution of two functions is equal to the product of the transforms of these two functions. By designating the power spectrum as $SP$:

$$SP \text{ of } f(t) = SP \text{ of } I(t) \times SP \text{ of } M(t)$$

The second-order power spectrum is the autocorrelation function (which will be represented by $ATC$) of the function $f(t)$:

$$ATC \text{ of } f(t) = ATC \text{ of } I(t) * ATC \text{ of } M(t)$$

However, it is known that the autocorrelation function of a nonperiodic function such as $I(t)$ is reduced to a Dirac pulse, which means a multiplication by a constant in convolution. Therefore:

$$ATC \text{ of } f(t) \text{ proportional to } ACT \text{ of } M(t)$$

The third-order power spectrum is the autocorrelation function of the first-order power spectrum. Hence:

$$ATC \text{ of } SP \text{ of } f(t) \text{ proportional to } SP \text{ of } ATC \text{ of } M(t)$$

It can be postulated that:

$$SP \text{ of } ATC \text{ of } M(t) = \text{spectrum of } M'(t)$$

The operator $M'(t)$ has the same spectral data as $M(t)$ but amplitudes which are the amplitudes of $M(t)$ raised to the fourth power.

The negative power spectrum of the third order which is employed as filter in the spectral plane 17 results in the ordinary product:

$$\text{spectrum of } f(t) \times 1/ \text{ spectrum of } M'(t)$$

The reconstitution system 8 forms the Fourier transform of said product or, in other words, there is obtained in the image plane 25 a light distribution which corresponds to the product of convolution:

$$f(t) \times \text{antisignal of } M'(t)$$

wherein the expression "antisignal of $M'(t)$" designates an operator having spectral amplitudes which are the reciprocal of those of $M'(t)$.

In actual fact, the result obtained is not strictly the product of deconvolution by $M(t)$ since the filter operates only in respect of the amplitudes and not of the phases. It is nevertheless apparent that the periodic elements are removed in the filtered image.

On the contrary, if the filter which is employed is the positive power spectrum of the third order, the random elements are removed.

It is readily apparent that the filter employed in the spectral plane 17 must be very carefully set in register with the first-order spectrum which is formed in this plane. A telescope can be employed which is focused on said spectral plane and also serves to view the filter and the first-order spectrum simultaneously. The television camera 21 serves to assess the effectiveness of the filtering.

By virtue of the respective focal lengths and relative positions of the spherical lens 26 and cylindrical lens 27 of the conversion system 7 of the bench of FIG. 3, the dimensions of the third order spectrum correspond to those of the first-order spectrum, with the result that filtering is carried out correctly.

There is shown in FIGS. 6 to 10 one example of processing by the method in accordance with the invention in which use is made of the spherocylindrical optical bench of FIG. 3.

Figure 6:
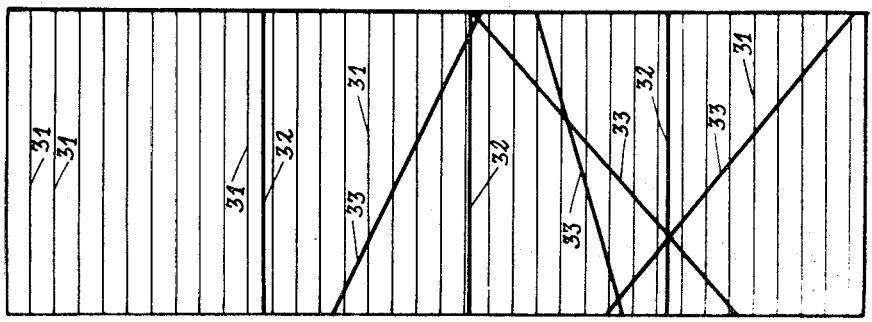
FIG. 6 is a view in elevation showing a document to be processed.

The original recording document to be processed can be seen in FIG. 6. A particularly simple document is illustrated in this figure in order that the mechanism of the process may become clearly apparent. The document has uniformly spaced parallel lines 31 which constitute the periodic elements. Further lines 32 which are parallel to the first have positions which are unrelated to the uniform repetition of the lines 31 and therefore constitute random elements. The document additionally comprises oblique lines 33 which also form part of the random elements. For the sake of enhanced clarity of the drawings, the periodic elements 31 are shown in thin lines and the random elements 32 and 33 are shown in thick lines.

The positive power spectrum which is obtained as a result of the successive operations a, b, c, as described earlier is illustrated in FIG. 9. This spectrum comprises a double series of transparent lines 34a and 34b in parallel and uniformly spaced relation. The constant spacing or period between these lines is the same as that of the elements of the first-order spectrum (not shown) which corresponds to the periodic lines 31 of the document of FIG. 6. The two series of lines are disposed symmetrically with respect to the central axis and correspond respectively to the positive and negative frequencies of the elements 31. There is also shown a central window 35 within which the sensitive emulsion of the negative film has been removed. This window is necessary in order to permit the passage of the light of the central band of the first-order spectrum, namely the image of the virtual point source, which corresponds to the constant term of zero order of the development in a Fourier series. If this central band were masked by the filter, the mean illumination of the image obtained would be very weak and the contrast would be highly exaggerated. The remainder of the spectrum surface as shown in crosshatchings is opaque.

Figure 7:
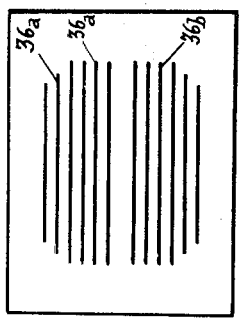
FIG. 7 is a view in elevation showing the filter corresponding to the negative spectrum of the third order.

The negative power spectrum of the third order is shown in FIG. 7 and corresponds to the positive spectrum after reversal of polarity in which the transparent portions become opaque and conversely. However, it should be noted that there is no opaque band which corresponds to the window 35 of FIG. 9 since the emulsion has been removed at this point for the reason given above. The negative spectrum therefore consists solely of a double series of opaque lines 36a and 36b which are disposed symmetrically with respect to a central axis.

For the sake of clarity of the drawings, the stray components or unwanted noise arising in particular from defects in lenses have not been shown in FIGS. 7 to 10.

The document of FIG. 6 is placed on the optical bench of FIG. 3 in such a manner as to ensure that the lines 31 are strictly perpendicular to the generatrices of the cylindrical lens 27.

Since the lines 31 of the original document are periodic, that portion of the first-order spectrum which corresponds thereto is composed of discrete elements which represent the successive terms of a Fourier series. If FIG. 6 is considered to be split up into bands located at right angles to the direction of the lines 31 and no account is taken of the nonperiodic elements 32 and 33, the first-order spectrum which is formed in the spectral plane 17 will exhibit in the case of each band a series of luminous points which are aligned at right angles to the central axis of the spectrum. In spherocylindrical optics, the individual spectra of each band are juxtaposed so that the first-order spectrum should have a double series of parallel bright lines on which is superimposed the spectrum of the random elements 32, 33.

Figure 9:
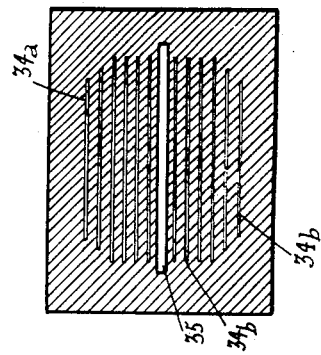
FIG. 9 is a view in elevation showing the filter corresponding to the positive spectrum of the third order.
Figure 10:
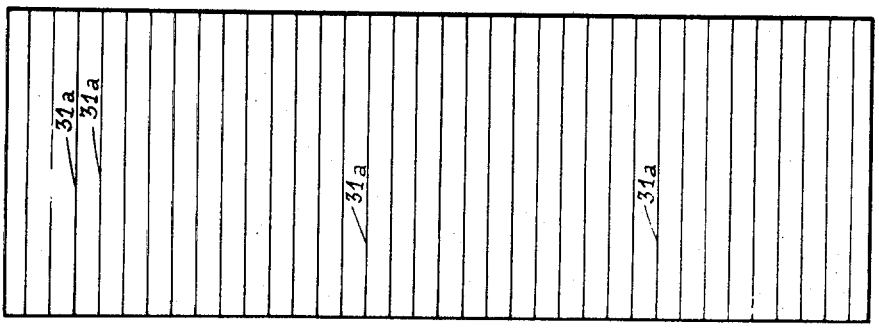
FIG. 10 is a view in elevation showing the image of the document of FIG. 6 as obtained by means of the filter of FIG. 9.

In accordance with the mode of formation of spectra of FIGS. 7 and 9 and by virtue of the relative positions of the spherical lens 26 and cylindrical lens 27, the lines of said spectra have the same spacing as the bright lines of the first-order spectrum.

Figure 8:
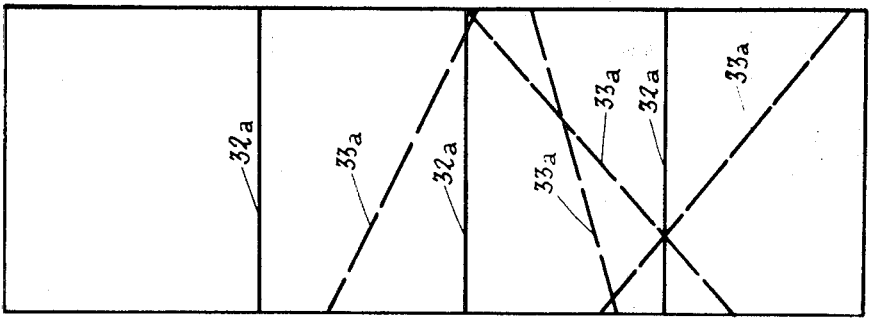
FIG. 8 is a view in elevation showing the image of the document of FIG. 6 as obtained by means of the filter of FIG. 7.

If the film which is shown in FIG. 7 is employed as a filter in the spectral plane 17, it is understood that the bright lines of the first-order spectrum will be masked by the opaque lines of the filter. The periodic elements 31 of the original document are therefore removed from the reconstituted and filtered image which is shown in FIG. 8 and in which only the random elements 32a and 33a remain.

On the contrary, if the film of FIG. 9 is employed as a filter, this latter will only permit the passage of the bright lines of the first-order spectrum which correspond to the periodic lines 31 and will remove that portion of the spectrum which corresponds to the random elements 32 and 33. There is accordingly obtained the filtered image of FIG. 10 in which only the periodic lines 31a remain.

If the original document is a seismic recording, it is apparent that the method makes it possible either to eliminate the "multiples" or on the contrary to allow only these latter to remain.

It is also known that another cause which complicates the reading of seismic records is the complex structure of the shock (explosion, for example) which has given rise to the acoustic or sound waves. Without taking the "multiples" into account, each seismogram is the product of convolution of the complex signal which represents said shock and of the "pulsed" seismogram which would correspond to an elementary shock represented by a single pulse. From the foregoing discussion, it is apparent that the method makes it possible to improve the actual seismogram by establishing a closer relationship to the pulsed seismogram.

As compared with the digital methods of data processing by means of computers, the method in accordance with the invention offers the advantage of speed and versatility. Furthermore, the cost entailed is only of the order of one-tenth of the cost of the digital processing technique.

It must be clearly understood that the invention is not limited to the embodiments hereinabove described and that many alternative forms of execution of these latter may be contemplated without thereby departing from the scope of this invention. For instance, in order to form the filter, it is not essential to reverse the film obtained by photographing the spectra of successive orders as explained above (operations a to c). Nevertheless, it has been demonstrated by experiment that this reversal makes it possible in particular to obtain records which exhibit a higher degree of contrast.

What I claim is:

1. An optical method for processing information represented by the transparency of a two-dimensional document in which the document is illuminated with a parallel beam of coherent monochromatic light, said document is placed in an object plane upstream of a convergent optical conversion system in order to obtain in the image focal plane of said conversion system which constitutes the spectral plane a diffraction pattern having a light amplitude corresponding to the spectrum of the function which represents the transparency of the document, a filter is placed downstream of the spectral plane so as to form a filtered image of the document, wherein use is made to form a filtered image of the document, wherein use is made of a filter consisting of a screen having a transparency which varies over its surface the autocorrelation function of the power spectrum of the function representing the transparency of the document.

2. A method in accordance with claim 1, wherein the preparation of the filter comprises the following steps:
   the document is placed in the object plane and the spectrum formed in the spectral plane is photographed so as to obtain a power spectrum of the first order,
   said power spectrum of the first order is placed in the object plane and the preceding operation is repeated in order to obtain a power spectrum of the second order,
   said second order spectrum is placed in the object plane and the operation is repeated in order to obtain a positive power spectrum of the third order, the transparency of which varies as the autocorrelation function of the first-order spectrum.

3. A method in accordance with claim 2, wherein the film obtained after each operation is reversed by producing an image on a photographic plate in contact with said film and to obtain a power spectrum of reverse polarity which is placed in the object plane in the following operation.

4. A method in accordance with claim 2, wherein the positive power spectrum of the third order is employed as a filter for the purpose of removing the nonperiodic random elements from the filtered image of the document.

5. A method in accordance with claim 2, wherein the positive power spectrum of the third order is reversed so as to obtain a negative spectrum of the third order which is employed as a filter for the purpose of removing the periodic elements from the filtered image of the document.

6. An optical device for processing information represented by the transparency of a two-dimensional document, comprising a source of coherent monochromatic light, a collimation system for illuminating the document with a beam of parallel rays, a convergent optical conversion system for forming in its image focal plane which constitutes the spectral plane a diffraction pattern whose light amplitude corresponds to the spectrum of the function representing the variations in transparency of the document, a filter located in the spectral plane and a convergent optical reconstitution system for forming a filtered image of the document, wherein the filter is constituted by a screen whose transparency varies over its surface as the autocorrelation function of the power spectrum of the function representing the transparency of the document.

7. A device in accordance with claim 6 as applicable to a document in which the information is distributed in parallel bands, wherein the optical conversion and reconstitution systems comprise a spherical lens associated with a cylindrical lens.

8. A device in accordance with claim 7, wherein the generatrices of the cylindrical lenses are disposed parallel to the bands of the document.

9. A device in accordance with claim 8, wherein the focal lengths and relative positions of the spherical and cylindrical lenses of the conversion system are selected in order to ensure that the dimensions of the third-order spectrum correspond to the dimensions of the first-order spectrum.

10. By way of novel industrial product, a filter for optical processing by the method of double diffraction of information represented by the transparency of a two-dimensional document, wherein the filter is constituted by a screen having a transparency which varies over its surface as the autocorrelation function of the power spectrum of the function representing the transparency of the document.

* * * * *

UNITED STATES PATENT OFFICE
CERTIFICATE OF CORRECTION

Patent No. 3,633,998        Dated January 11, 1971

Inventor(s) Bernard Bourrouilh

It is certified that error appears in the above-identified patent and that said Letters Patent are hereby corrected as shown below:

On the cover page of the application in the heading of the patent the name of the Assignee should read -- Entreprise de Recherches et d'Activites Petrolieres --.

Signed and sealed this 17th day of October 1972.

(SEAL)
Attest:

EDWARD M. FLETCHER, JR.
Attesting Officer

ROBERT GOTTSCHALK
Commissioner of Patents